(12) United States Patent
Chang et al.

(10) Patent No.: US 12,236,657 B2
(45) Date of Patent: Feb. 25, 2025

(54) IMAGE PROCESSING METHOD AND COMPUTING DEVICE

(71) Applicant: HON HAI PRECISION INDUSTRY CO., LTD., New Taipei (TW)

(72) Inventors: Yueh Chang, New Taipei (TW); Chin-Pin Kuo, New Taipei (TW); Guo-Chin Sun, New Taipei (TW)

(73) Assignee: HON HAI PRECISION INDUSTRY CO., LTD., New Taipei (TW)

( * ) Notice: Subject to any disclaimer, the term of this patent is extended or adjusted under 35 U.S.C. 154(b) by 278 days.

(21) Appl. No.: 17/566,610

(22) Filed: Dec. 30, 2021

(65) Prior Publication Data

US 2022/0215644 A1 Jul. 7, 2022

(30) Foreign Application Priority Data

Jan. 5, 2021 (CN) .......................... 202110006441.2

(51) Int. Cl.
*G06V 10/26* (2022.01)
*G06T 3/4053* (2024.01)
(Continued)

(52) U.S. Cl.
CPC ............ *G06V 10/26* (2022.01); *G06T 3/4053* (2013.01); *G06T 7/11* (2017.01); *G06V 10/32* (2022.01);
(Continued)

(58) Field of Classification Search
CPC ............ G06T 7/11; G06T 2207/30041; G06T 2207/10024; G06T 7/12; G06T 2207/10021; G06T 2207/10048; G06T 2207/10101; G06T 2207/20012; G06T 2207/20021; G06T 2207/20132; G06T 2207/30088; G06T 2207/30096; G06T 2207/30101; G06T 2207/30216; G06T 2210/41; G06T 5/50; G06T 5/77; G06T 7/0004; G06T 7/0012; G06T 7/136; G06T 7/246; G06T 7/90; G06T 7/97; G06T 2207/10004; G06T 2207/20081; G06T 2207/20084; G06T 2207/20101; G06T 7/149; G06T 7/187; G06V 20/20; G06V 10/10; G06V 10/17; G06V 10/235;
(Continued)

(56) References Cited

U.S. PATENT DOCUMENTS

2014/0056520 A1* 2/2014 Rodriguez Serrano ...................... G06V 10/7715
382/173
2022/0076117 A1* 3/2022 Amon ........................ G06T 7/70

FOREIGN PATENT DOCUMENTS

CN 108509891 * 9/2018 ............. G06V 20/56
CN 109886215 6/2019
(Continued)

*Primary Examiner* — Zhiyu Lu
(74) *Attorney, Agent, or Firm* — ScienBiziP, P.C.

(57) ABSTRACT

In an image processing method, a detection image and a marked image are obtained. An image segmentation model is applied to segment a first segmented image from the detection image. The first segmented image is corrected according to the marked image to obtain a second segmented image. A size of the second segmented image is adjusted to obtain an adjusted segmented image. The adjusted segmented image is used as a standard segmented image of the detection image. The method improves accuracy of image segmentation and recognition.

12 Claims, 3 Drawing Sheets

(51) Int. Cl.
  *G06T 7/11* (2017.01)
  *G06V 10/32* (2022.01)
  *G06V 10/56* (2022.01)
  *G06V 10/75* (2022.01)

(52) U.S. Cl.
  CPC ............ *G06V 10/56* (2022.01); *G06V 10/751* (2022.01); *G06T 2207/10024* (2013.01)

(58) Field of Classification Search
  CPC .... G06V 40/193; G06V 10/26; G06V 10/454; G06V 10/469; G06V 10/774; G06V 10/82; A61B 1/000094; A61B 1/000095; A61B 1/000096; A61B 18/20; A61B 18/203; A61B 2017/00115; A61B 2017/00119; A61B 2018/00452; A61B 2018/00476; A61B 2018/00904; A61B 2034/2065; A61B 2090/061; A61B 2090/365; A61B 2090/373; A61B 2090/3735; A61B 2090/502; A61B 34/20; A61B 34/25; A61B 34/72; A61B 34/76; A61B 5/0059; A61B 5/0062; A61B 5/0064; A61B 5/0068; A61B 5/444; A61B 5/7264; A61B 5/745; A61B 90/03; A61B 90/20; A61F 9/007; A61F 9/00736; G02B 15/12; G06F 2203/04806; G06F 2203/04808; G06F 3/0482; G06F 3/04883; H04M 1/02; H04M 1/624; H04N 23/00; H04N 23/62; H04N 23/63; H04N 23/631; H04N 23/635; H04N 23/64; H04N 23/667; H04N 23/67; H04N 23/6812; H04N 23/69; H04N 23/698; H04N 5/262; H04N 9/3114
  See application file for complete search history.

(56) References Cited

FOREIGN PATENT DOCUMENTS

| | | | | |
|---|---|---|---|---|
| CN | 110503653 | * | 11/2019 | ............... G06T 7/10 |
| CN | 111667483 | | 9/2020 | |
| CN | 113411550 | * | 9/2021 | ............... H04N 9/04 |

* cited by examiner

IMAGE PROCESSING METHOD AND COMPUTING DEVICE

FIELD

The present disclosure relates to an image processing method and a computing device.

BACKGROUND

A model for recognition (hereinafter "recognition model") may be used in object recognition, such as recognition of human faces or of other objects in a street view image. In order to improve a recognition accuracy of the recognition model, a training set may be optimized and used to re-train the recognition model. How to optimize the training set is particularly important.

BRIEF DESCRIPTION OF THE DRAWINGS

In order to more clearly describe the technical solutions in the embodiments of the present disclosure or the prior art, the following will briefly introduce the drawings that need to be used in the description of the embodiments or the prior art. Obviously, the drawings in the following description are only examples. For those of ordinary skill in the art, other drawings can be obtained according to the provided drawings without creative work.

DETAILED DESCRIPTION

In order to provide a more clear understanding of the objects, features, and advantages of the present disclosure, the same are given with reference to the drawings and specific embodiments. It should be noted that the embodiments in the present disclosure and the features in the embodiments may be combined with each other without conflict.

In the following description, numerous specific details are set forth in order to provide a full understanding of the present disclosure. The present disclosure may be practiced otherwise than as described herein. The following specific embodiments are not to limit the scope of the present disclosure.

Unless defined otherwise, all technical and scientific terms herein have the same meaning as used in the field of the art technology as generally understood. The terms used in the present disclosure are for the purposes of describing particular embodiments and are not intended to limit the present disclosure.

Figure 1:
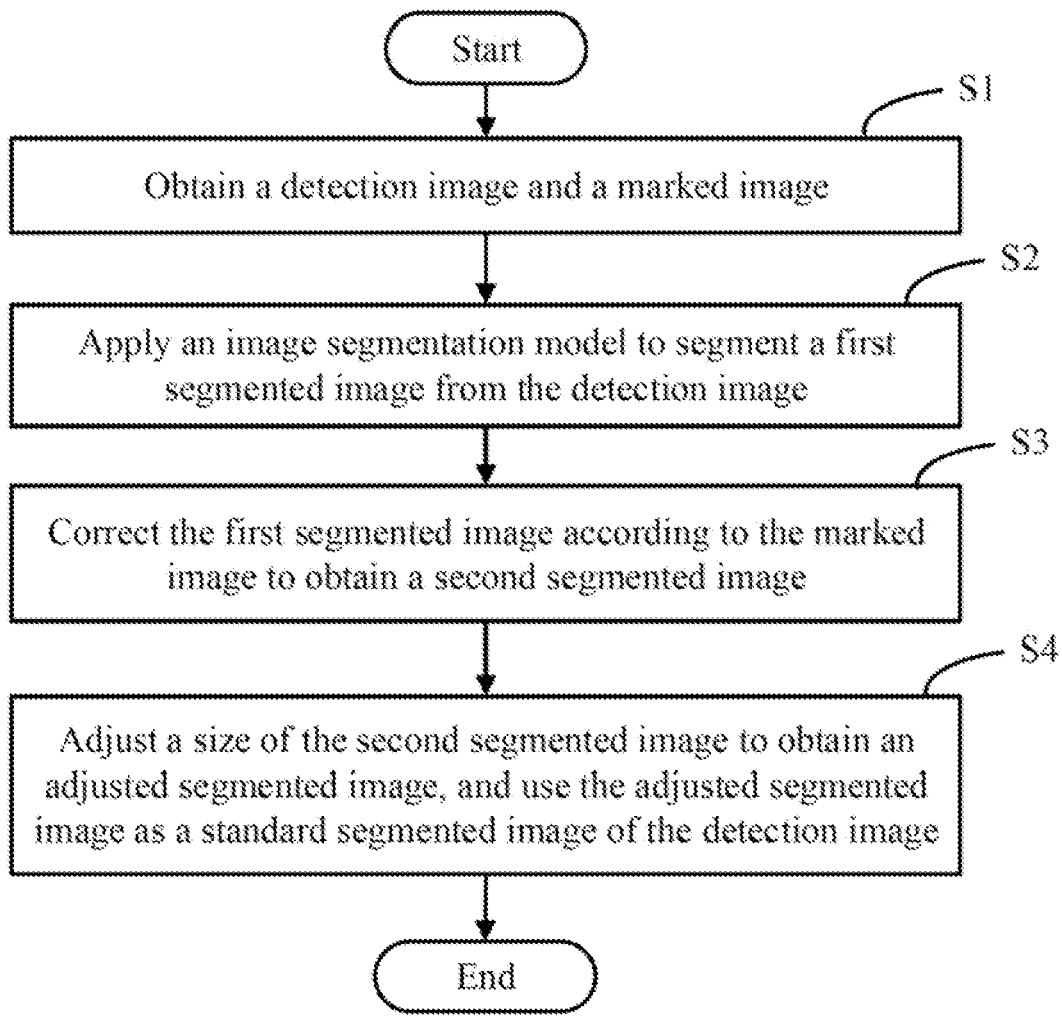
FIG. 1 shows a flow chart of one embodiment of an image processing method of the present disclosure.

FIG. 1 shows a flow chart of one embodiment of an image processing method of the present disclosure.

In this embodiment, the image processing method can be applied to a computing device. For a computing device used for image processing, the computing device can be directly integrated with the function of image processing. The computing device can also achieve the function of image processing by running a Software Development Kit (SDK).

Referring to FIG. 1, the method is provided by way of example, as there are a variety of ways to carry out the method. Each block shown in FIG. 1 represents one or more processes, methods, or subroutines, carried out in the method. Furthermore, the illustrated order of blocks is illustrative only and the order of the blocks can be changed. Additional blocks can be added or fewer blocks can be utilized without departing from this disclosure.

At block S1, the computing device obtains an image for analysis (detection image) and a marked image.

In one embodiment, the detected image may be a street view image or an image of other objects.

The marked image is obtained by marking objects in the detection image. In one embodiment, a size of the detection image is same as size of the marked image.

For example, the detecting image is a street view image including roads, electricity poles, and pedestrians. The marked image can be obtained by marking roads, electricity poles, and pedestrians in the street view image.

In one embodiment, the detection image may be used as a sample image for training an object recognition model.

At block S2, the computing device applies an image segmentation model to segment a first segmented image from the detection image.

In one embodiment, the image segmentation model may include a feature extraction model and a classification model. The feature extraction model is used to extract features of objects in the detection image, and the classification model is used to upsample the detection image, determine types of the objects in the detection image, and output the first segmented image. The feature extraction model may be a VGG model, a ResNet model, etc. The classification model may be a Fully Convolutional Network (FCN) model or a Fully Connected Conditional Random Field (CRF) model, etc.

It should be noted that, a size of the first segmented image may be smaller than a size of the detection image.

At block S3, the computing device corrects the first segmented image according to the marked image to obtain a second segmented image.

In one embodiment, correcting the first segmented image according to the marked image to obtain a second segmented image may include: setting a scale factor; and performing super-resolution processing on the first segmented image according to the scale factor and the marked image to obtain the second segmented image.

In one embodiment, the scale factor may be set by a user and may be 2 or 4 for example.

In one embodiment, performing a super-resolution processing on the first segmented image according to the scale factor and the marked image to obtain the second segmented image comprising includes the process of (a1)-(a1) as follows.

(a1) The computing device generates a reference image according to the scale factor and a size of the first segmented image.

For example, if the size of the first segmented image is 60*120, and the scale factor is 4, a size of the reference image is 240*480.

In one embodiment, initial RGB values of pixels in the reference image are constant. For example, initial RGB values of pixels in the reference image are 0 or 255.

(a2) The computing device sets RGB values for first pixels in the reference image according to the first segmented image.

In one embodiment, the first pixels are pixels located at odd rows and odd columns in the reference image.

Figure 2:
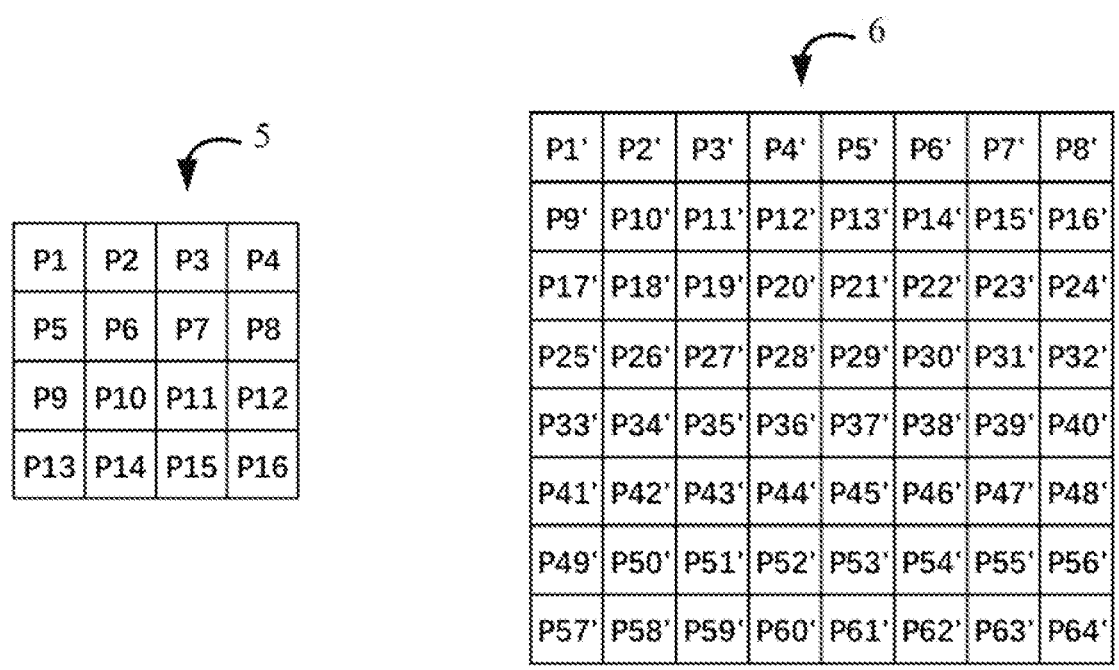
FIG. 2 illustrates an example of setting RGB values of pixels.

For example, referring to FIG. 2, assuming that a size of a first segmented image 5 is 4*4 and the scale factor is 2, a reference image 6 is generated according to the first segmented image 5 and the scale factor. A size of the reference image 6 is 8*8. In the reference image 6, pixels denoted as P1', P3', P5', P7', P17', P19', P21', P23' . . . P49', P51', P53', P55' are the first pixels.

In one embodiment, setting RGB values for first pixels in the reference image according to the first segmented image includes the process of (a21)-(a22) as follows.

(a21) The computing device obtains RGB values of all pixels in each row in the first segmented image.

(a22) The computing device sets the RGB values of the first pixel according to the RGB values of all pixels of each row in the first segmented image.

Specifically, the computing device associates each row of the first segmented image with an odd row in the reference image in a top-to-bottom order.

For example, the computing device associates a first row of the first segmented image with a first odd row (that is, a first row) of the reference image, associates a second row of the first segmented image with a second odd row (that is, a third row) of the reference image, associates a third row of the first segmented image with a third odd row (that is, a fifth row) of the reference image, and associates a fourth row of the first segmented image with a fourth odd row (that is, a seventh row) of the reference image.

The computing device sets an RGB value of the first pixel corresponding to each row in the reference image as an RGB value of a corresponding pixel of a corresponding row in the first segmented image in a left-to-right order.

For example, referring to FIG. 2, assuming that RGB values of pixels P1, P2, P3, P4 in a first row of the first segmented image 5 are obtained, RGB values of pixels P1', P3', P5', P7' in a first row of the reference image 6 are set as the RGB values of the pixels P1, P2, P3, P4. That is, RGB value of P1' is set as RGB value of P1, RGB value of P3' is set as RGB value of P2, RGB value of P5' is set as RGB value of P3, and RGB value of P7' is set as RGB value of P4. Similarly, RGB value of P17' is set as RGB value of P5, RGB value of P19' is set as RGB value of P6, RGB value of P21' is set as RGB value of P7, and RGB value of P23' is set as RGB value of P8.

(a3) The computing device sets RGB values for second pixels other than the first pixels in the reference image according to the RGB values of the first pixels and the marked image. The first pixels and the second pixels compose all pixels in the reference image.

In one embodiment, setting RGB values for second pixels other than the first pixels in the reference image according to the RGB values of the first pixels and the marked image includes the process of (a31)-(a35) as follows.

(a31) The computing device determines a pixel corresponding to a second pixel from the marked image (referred to as "marked pixel") according to a position of the second pixel in the reference image.

In one embodiment, a position of the marked pixel in the marked image is the same as a position of the second pixel in the reference image. The position are denoted as coordinates.

(a32) The computing device determines two pixels adjacent to the second pixel (hereinafter "two adjacent pixels of the second pixel") according to the position of the second pixel in the reference image, and calculates an average RGB value of the adjacent pixels as a reference RGB value of the second pixel.

In one embodiment, the two adjacent pixels of the second pixel may include a first pixel on the left of the second pixel and a first pixel on the right of the second pixel. In another embodiment, the two adjacent pixels of the second pixel may include a first pixel above the second pixel points and a first pixel below the second pixel points.

In other embodiments, the two adjacent pixels of the second pixel may be selected from the first pixel on the left of the second pixel, the first pixel on the right of the second pixel, the first pixel above the second pixel, and the first pixel below the second pixel.

(a33) The computing device compares the reference RGB value of the second pixel with an RGB value of the marked pixel.

(a34) When the reference RGB value of the second pixel is same as the RGB value of the marked pixel, the computing device sets an RGB value of the second pixel as the reference RGB value of the second pixel.

(a35) When the reference RGB value of the second pixel is not same as the RGB value of the marked pixel, the computing device sets the RGB value of the second pixel according to the reference RGB value of the second pixel and the RGB value of the marked pixel.

In one embodiment, the RGB value of the second pixel may be set as an average of the reference RGB value of the second pixel and the RGB value of the marked pixel.

(a4) The computing device uses the reference image as the second segmented image after the RGB values of all pixels in the reference image are set.

At block S4, the computing device adjusts a size of the second segmented image to obtain an adjusted segmented image, and uses the adjusted segmented image as a standard segmented image of the detection image.

In one embodiment, adjusting a size of the second segmented image to obtain an adjusted segmented image may include: scaling the second segmented image to a size same as that of the detection image.

In the embodiment, each sample image in a training set can be segmented according to S1-S4, and an object recognition model can be trained based on the standard segmented image corresponding to each sample image. As a result, the accuracy of the object recognition model is improved.

FIG. 1 introduces the image processing method in detail. Functional modules of an image processing for implementing the image processing method and a computing device for implementing the image processing method are introduced below with reference to FIGS. 3 and 4.

The above description is only embodiments of the present disclosure, and is not intended to limit the present disclosure, and various modifications and changes can be made to the present disclosure.

Figure 3:
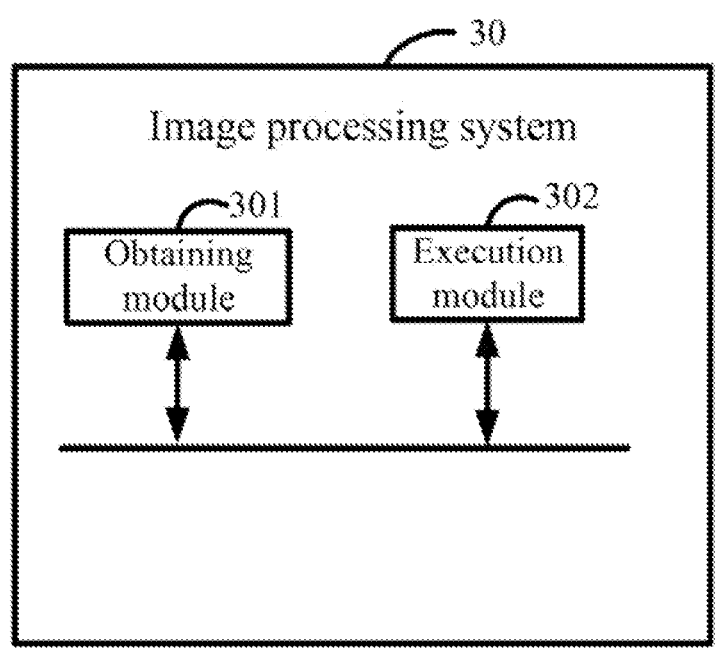
FIG. 3 shows one embodiment of modules of an image processing system of the present disclosure.

FIG. 3 shows one embodiment of modules of an image processing system of the present disclosure.

In some embodiments, the image processing system 30 can run in a computer device 3. The image processing system 30 may include functional modules composed of program code. The program code can be stored in a storage device 31 of the computer device 3 and executed by at least one processor 32 to implement a function of image processing (for details, see the introduction to FIG. 2 below).

In the embodiment, the image processing system 30 can include a plurality of functional modules. The functional modules may include an obtaining module 301 and an execution module 302. The modules referred to in the present disclosure refer to a series of computer-readable instructions that can be executed by at least one processor, and can complete functions, and can be stored in a storage device. In this embodiment, functions of each module will be described in detail with reference to FIG. 3.

The obtaining module 301 can obtain a detection image and a marked image. The execution module 302 can apply an image segmentation model to segment a first segmented image from the detection image. The execution module 302 can further correct the first segmented image according to the marked image to obtain a second segmented image, adjust a size of the second segmented image to obtain an adjusted segmented image, and use the adjusted segmented image as a standard segmented image of the detection image.

Figure 4:
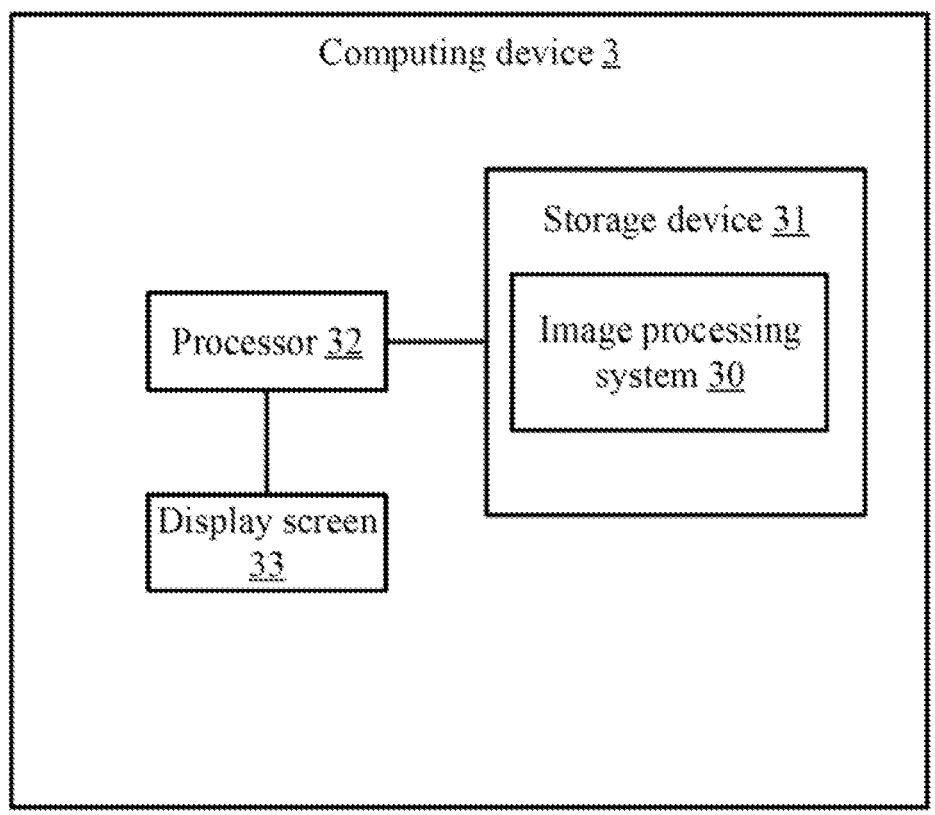
FIG. 4 illustrates a computing device for image processing according to one embodiment of the present disclosure.

FIG. 4 illustrates a computing device according to one embodiment of the present disclosure. In one embodiment, the computing device 3 includes a storage device 31, at least one processor 32, and a display screen 33. Those skilled in the art should understand that the structure of the computing device 3 shown in FIG. 4 does not constitute a limitation of the embodiment of the present disclosure. Other examples of computing device 3 can further include more or less other hardware or software than that shown in FIG. 4, or the computing device 3 can have different component arrangements.

In some embodiments, the computer device 3 may be a terminal capable of automatically performing numerical calculation and/or information processing in accordance with pre-set or stored instructions. The computer device 3 may include, but is not limited to, a microprocessor, an application specific integrated circuit, a programmable gate array, a digital processor, and an embedded device, etc.

In some embodiments, the storage device 31 may be used to store program codes and various data of computer programs. For example, the storage device 31 may be used to store an image processing system 30 installed in the computing device 3 and implement completion of storing programs or data during an operation of the computing device 3. The storage device 31 may include Read-Only Memory (ROM), Programmable Read-Only Memory (PROM), and Erasable Programmable Read-Only Memory. EPROM), One-time Programmable Read-Only Memory (OTPROM), Electronically-Erasable Programmable Read-Only Memory (EEPROM), Compact Disc (Compact Disc) Read-Only Memory (CD-ROM) or other optical disk storage, disk storage, magnetic tape storage, or any other non-transitory computer-readable storage medium that can be used to carry or store data.

In some embodiments, the at least one processor 32 may be composed of an integrated circuit. For example, the at least one processor 32 can be composed of a single packaged integrated circuit or can be composed of multiple packaged integrated circuits with the same function or different functions. The at least one processor 32 includes one or more central processing units (CPUs), one or more microprocessors, one or more digital processing chips, one or more graphics processors, and various control chips. The at least one processor 32 is a control unit of the computing device 3. The at least one processor 32 uses various interfaces and lines to connect various components of the computing device 3, and executes programs or modules or instructions stored in the storage device 31, and invokes data stored in the storage device 31 to perform various functions of the computing device 3 and to process data, for example, perform a function of image processing.

Although not shown, the computing device 3 may also include a power source (such as a battery) for supplying power to various components. The power source may be logically connected to the at least one processor 32 through a power management device, so as to realize functions such as charging, discharging, and power consumption management. The power supply may also include components such as one or more direct current or alternating current power supplies, recharging devices, power failure detection circuits, power converters or inverters, and power status indicators. The computing device 3 may also include various sensors, BLUETOOTH modules, WI-FI modules, etc.

The present disclosure is not limited to the details of the above-described exemplary embodiments, and the present disclosure can be embodied in other specific forms without departing from the spirit or essential characteristics of the present disclosure.

In this embodiment, an integrated unit implemented in a form of a software module can be stored in a non-transitory readable storage medium. The above modules include one or more computer-readable instructions. The computing device 3 or a processor implements the one or more computer-readable instructions, such that the method for image processing shown is achieved.

In a further embodiment, referring to FIG. 3, the at least one processor 32 can execute an operating system of the computing device 3, various types of applications (such as the image processing system 30 described above), program codes, and the like.

The storage device 31 stores program codes of a computer program, and the at least one processor 32 can invoke the program codes stored in the storage device 31 to achieve related functions. For example, each module of the image processing system 30 shown in FIG. 3 is program code stored in the storage device 31. Each module of the image processing system 30 shown in FIG. 3 is executed by the at least one processor 32, such that the functions of the modules are achieved, and the purpose of image processing method of FIG. 1 is achieved.

The above description is only embodiments of the present disclosure, and is not intended to limit the present disclosure, and various modifications and changes can be made to the present disclosure. Any modifications, equivalent substitutions, improvements, etc. made within the spirit and scope of the present disclosure are intended to be included within the scope of the present disclosure.

In the several embodiments provided in the preset disclosure, the disclosed computing device and method can be implemented in other ways. For example, the embodiments of the devices described above are merely illustrative. For example, the units are divided only according to logical function, and there can be other manners of division in actual implementation.

The modules described as separate components may or may not be physically separated, and the components displayed as modules may or may not be physical units, that is, they may be located in one place, or they may be distributed on multiple network units. Some or all of the modules can be selected according to actual needs to achieve the objectives of the solutions of the embodiments.

In addition, each functional unit in each embodiment of the present disclosure can be integrated into one processing unit, or can be physically present separately in each unit or two or more units can be integrated into one unit. The above modules can be implemented in a form of hardware or in a form of a software functional unit.

The present disclosure is not limited to the above-described exemplary embodiments, and the present disclosure can be embodied in other specific forms without departing from the spirit or essential characteristics of the present disclosure. Therefore, the present embodiments are to be considered as illustrative and not restrictive, and the scope of the present disclosure is defined by the appended claims. All changes and variations in the meaning and scope of equivalent elements are included in the present disclosure. Any reference sign in the claims should not be construed as limiting the claim. Furthermore, the word "comprising" does not exclude other units nor does the singular exclude the plural. A plurality of units or devices stated in the system claims may also be implemented by one unit or device through software or hardware. Words such as "first" and "second" are used to indicate names, but not any particular order.

Finally, the above embodiments are only used to illustrate technical solutions of the present disclosure and are not to be taken as restrictions on the technical solutions. Although the present disclosure has been described in detail with reference to the above embodiments, those skilled in the art should understand that the technical solutions described in one embodiment can be modified, or some of the technical features can be equivalently substituted, and that these modifications or substitutions are not to detract from the essence of the technical solutions or from the scope of the technical solutions of the embodiments of the present disclosure.

We claim:

1. An image processing method applied to a computing device, the method comprising:
   obtaining a detection image and a marked image, the marked image being obtained by marking objects in the detection image;
   applying an image segmentation model to segment a first segmented image from the detection image, the detection image being a street view image, the image segmentation model comprising a feature extraction model and a classification model, the feature extraction model being used to extract features of the objects in the detection image, and the classification model being used to up-sample the detection image, determine types of the objects in the detection image, and output the first segmented image, wherein a size of the detection image is same as a size of the marked image, and a size of the first segmented image is smaller than the size of the detection image;
   correcting the first segmented image according to the marked image to obtain a second segmented image, comprising: setting a scale factor; and performing a super-resolution processing on the first segmented image according to the scale factor and the marked image to obtain the second segmented image, comprising generating a reference image according to the scale factor and the size of the first segmented image, initial RGB values of all pixels in the reference image being same; setting RGB values for first pixels in the reference image according to the first segmented image; setting RGB values for second pixels other than the first pixels in the reference image according to the RGB values of the first pixels and the marked image; and using the reference image as the second segmented image after the RGB values of all pixels in the reference image are set; and
   adjusting a size of the second segmented image to obtain an adjusted segmented image, and using the adjusted segmented image as a standard segmented image of the detection image.

2. The image processing method according to claim 1, wherein the first pixels are pixels located at odd rows and odd columns in the reference image; and
   setting RGB values for first pixels in the reference image according to the first segmented image comprises:
   obtaining RGB values of all pixels in each row in the first segmented image; and
   setting the RGB values of the first pixel according to the RGB values of all pixels of each row in the first segmented image, comprising: associating each row of the first segmented image with an odd row in the reference image in a top-to-bottom order; setting an RGB value of the first pixel corresponding to each row in the reference image as an RGB value of a corresponding pixel of a corresponding row in the first segmented image in a left-to-right order.

3. The image processing method according to claim 2, wherein setting RGB values for second pixels other than the first pixels in the reference image according to the RGB values of the first pixels and the marked image comprises:
   determining a marked pixel corresponding to a second pixel from the marked image according to a position of the second pixel in the reference image;
   determining two adjacent pixels of the second pixel according to the position of the second pixel in the reference image, and calculating an average RGB value of the two adjacent pixels as a reference RGB value of the second pixel;
   comparing the reference RGB value of the second pixel with an RGB value of the marked pixel;
   when the reference RGB value of the second pixel is same as the RGB value of the marked pixel, setting an RGB value of the second pixel as the reference RGB value of the second pixel; and
   when the reference RGB value of the second pixel is not same as the RGB value of the marked pixel, setting the RGB value of the second pixel according to the reference RGB value of the second pixel and the RGB value of the marked pixel.

4. The image processing method according to claim 1, wherein adjusting a size of the second segmented image to obtain an adjusted segmented image comprises:
   scaling the second segmented image to a size same as the detection image.

5. A computing device comprising:
   at least one processor; and
   a storage device storing computer-readable instructions, which when executed by the at least one processor, cause the at least one processor to:
   obtain a detection image and a marked image, the marked image being obtained by marking objects in the detection image;
   apply an image segmentation model to segment a first segmented image from the detection image, the detection image being a street view image, the image segmentation model comprising a feature extraction model and a classification model, the feature extraction model being used to extract features of the objects in the detection image, and the classification model being used to up-sample the detection image, determine types of the objects in the detection image, and output the first segmented image, wherein a size of the detection image is same as a size of the marked image, and a size of the first segmented image is smaller than the size of the detection image;
   correct the first segmented image according to the marked image to obtain a second segmented image, comprising: setting a scale factor; and performing a super-resolution processing on the first segmented image according to the scale factor and the marked image to obtain the second segmented image, comprising generating a reference image according to the scale factor and the size of the first segmented image, initial RGB values of all pixels in the reference image being same; setting RGB values for first pixels in the reference image according to the first segmented image; setting RGB values for second pixels other than the first pixels in the reference image according to the RGB values of the first pixels and the marked image; and using the reference image as the second segmented image after the RGB values of all pixels in the reference image are set; and adjust a size of the second segmented image to obtain an adjusted segmented image, and use the adjusted segmented image as a standard segmented image of the detection image.

6. The computing device according to claim 5, wherein the first pixels are pixels located at odd rows and odd columns in the reference image; and the at least one processor is further caused to:

obtain RGB values of all pixels in each row in the first segmented image; and set the RGB values of the first pixel according to the RGB values of all pixels of each row in the first segmented image, comprising: associating each row of the first segmented image with an odd row in the reference image in a top-to-bottom order; setting an RGB value of the first pixel corresponding to each row in the reference image as an RGB value of a corresponding pixel of a corresponding row in the first segmented image in a left-to-right order.

7. The computing device according to claim 6, wherein the at least one processor is further caused to:

determine a marked pixel corresponding to a second pixel from the marked image according to a position of the second pixel in the reference image;

determine two adjacent pixels of the second pixel according to the position of the second pixel in the reference image, and calculate an average RGB value of the two adjacent pixels as a reference RGB value of the second pixel;

compare the reference RGB value of the second pixel with an RGB value of the marked pixel;

when the reference RGB value of the second pixel is same as the RGB value of the marked pixel, set an RGB value of the second pixel as the reference RGB value of the second pixel; and when the reference RGB value of the second pixel is not same as the RGB value of the marked pixel, set the RGB value of the second pixel according to the reference RGB value of the second pixel and the RGB value of the marked pixel.

8. The computing device according to claim 5, wherein the at least one processor is further caused to:

scale the second segmented image to a size same as the detection image.

9. A non-transitory storage medium having instructions stored thereon, when the instructions are executed by a processor of a computing device, the processor is configured to perform an image processing method, the method comprising:

obtaining a detection image and a marked image, the marked image being obtained by marking objects in the detection image;

applying an image segmentation model to segment a first segmented image from the detection image, the detection image being a street view image, the image segmentation model comprising a feature extraction model and a classification model, the feature extraction model being used to extract features of the objects in the detection image, and the classification model being used to up-sample the detection image, determine types of the objects in the detection image, and output the first segmented image, wherein a size of the detection image is same as a size of the marked image, and a size of the first segmented image is smaller than the size of the detection image;

correcting the first segmented image according to the marked image to obtain a second segmented image, comprising: setting a scale factor; and performing a super-resolution processing on the first segmented image according to the scale factor and the marked image to obtain the second segmented image, comprising generating a reference image according to the scale factor and the size of the first segmented image, initial RGB values of all pixels in the reference image being same; setting RGB values for first pixels in the reference image according to the first segmented image; setting RGB values for second pixels other than the first pixels in the reference image according to the RGB values of the first pixels and the marked image; and using the reference image as the second segmented image after the RGB values of all pixels in the reference image are set; and adjusting a size of the second segmented image to obtain an adjusted segmented image, and using the adjusted segmented image as a standard segmented image of the detection image.

10. The non-transitory storage medium according to claim 9, wherein the first pixels are pixels located at odd rows and odd columns in the reference image; and setting RGB values for first pixels in the reference image according to the first segmented image comprises:

obtaining RGB values of all pixels in each row in the first segmented image; and setting the RGB values of the first pixel according to the RGB values of all pixels of each row in the first segmented image, comprising: associating each row of the first segmented image with an odd row in the reference image in a top-to-bottom order; setting an RGB value of the first pixel corresponding to each row in the reference image as an RGB value of a corresponding pixel of a corresponding row in the first segmented image in a left-to-right order.

11. The non-transitory storage medium according to claim 10, wherein setting RGB values for second pixels other than the first pixels in the reference image according to the RGB values of the first pixels and the marked image comprises:

determining a marked pixel corresponding to a second pixel from the marked image according to a position of the second pixel in the reference image;

determining two adjacent pixels of the second pixel according to the position of the second pixel in the reference image, and calculating an average RGB value of the two adjacent pixels as a reference RGB value of the second pixel;

comparing the reference RGB value of the second pixel with an RGB value of the marked pixel;

when the reference RGB value of the second pixel is same as the RGB value of the marked pixel, setting an RGB value of the second pixel as the reference RGB value of the second pixel; and when the reference RGB value of the second pixel is not same as the RGB value of the marked pixel, setting the RGB value of the second pixel according to the reference RGB value of the second pixel and the RGB value of the marked pixel.

12. The non-transitory storage medium according to claim 9, wherein adjusting a size of the second segmented image to obtain an adjusted segmented image comprises:
scaling the second segmented image to a size same as the detection image.

* * * * *